US007168836B2

(12) United States Patent
Tatsukawa

(10) Patent No.: US 7,168,836 B2
(45) Date of Patent: Jan. 30, 2007

(54) VEHICLE ILLUMINATION LAMP

(75) Inventor: Masashi Tatsukawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 116 days.

(21) Appl. No.: 11/095,524

(22) Filed: Apr. 1, 2005

(65) Prior Publication Data

US 2005/0219856 A1 Oct. 6, 2005

(30) Foreign Application Priority Data

Apr. 2, 2004 (JP) .......................... P.2004-110432

(51) Int. Cl.
*B60Q 1/04* (2006.01)

(52) U.S. Cl. ....................... 362/538; 362/507; 362/328

(58) Field of Classification Search ................. 362/538
See application file for complete search history.

(56) References Cited

U.S. PATENT DOCUMENTS

| | | | | |
|---|---|---|---|---|
| 4,918,580 | A * | 4/1990 | Nino | 362/539 |
| 4,951,179 | A * | 8/1990 | Machida | 362/522 |
| 5,307,247 | A * | 4/1994 | Cejnek | 362/539 |
| 6,338,568 | B1 * | 1/2002 | Futami | 362/538 |
| 6,773,146 | B2 * | 8/2004 | Ishida | 362/460 |
| 6,948,836 | B2 * | 9/2005 | Ishida et al. | 362/516 |
| 6,951,416 | B2 * | 10/2005 | Sazuka et al. | 362/538 |
| 6,997,587 | B2 * | 2/2006 | Albou | 362/516 |
| 7,073,931 | B2 * | 7/2006 | Ishida | 362/539 |

FOREIGN PATENT DOCUMENTS

| | | | |
|---|---|---|---|
| DE | 101 10 132 | A1 | 1/2003 |
| JP | 2001-266620 | A | 9/2001 |
| JP | 2002-170409 | A | 6/2002 |
| JP | 2003-317513 | A | 11/2003 |

* cited by examiner

*Primary Examiner*—Ali Alavi
*Assistant Examiner*—Hargobind S. Sawhney
(74) *Attorney, Agent, or Firm*—Sughrue Mion, PLLC

(57) ABSTRACT

A cylindrical lens extends generally in a width direction of a vehicle, and light from three light-emitting elements, rearward of a rear focal line of the cylindrical lens, is reflected forward by three reflectors. A reflecting surface of each reflector has an elliptical vertical cross-sectional shape in a vertical plane perpendicular to the rear focal line. The first focus is at a center of light-emission of the corresponding light-emitting element, while the second focus lies at a point in the vicinity of the rear focal line. The rate of utilization of light flux from each light-emitting element is enhanced, and a luminous distribution patter having a relatively small width in an upward-downward orientation is formed. When the cylindrical lens and each reflector are deviated from their respective proper positions in the direction of the width of the vehicle, the luminous distribution patter of a constant shape can be formed.

4 Claims, 8 Drawing Sheets

VEHICLE ILLUMINATION LAMP

The present application claims foreign priority based on Japanese Patent Application 2004-110432, which was filed on Apr. 2, 2004, the contents of which are incorporated herein by reference in their entirety. This priority claim is being submitted concurrently with the filing of the application.

BACKGROUND OF THE INVENTION

1. Technical Field

This invention relates to a vehicle illumination lamp using light-emitting elements (such as light-emitting diodes) as a light source.

2. Background

In the related art, vehicle illumination lamps using a light-emitting diode as a light source have been extensively used.

JP-A-2003-317513 discloses a vehicle illumination lamp including a plurality of lamp units each having a light-emitting diode as a light source. Each lamp unit of this vehicle illumination lamp is designed such that light from the light-emitting diode is reflected by a reflector, and is irradiated forward via a projection lens.

JP-A-2001-266620 discloses a vehicle illumination lamp in which light from a plurality of light-emitting diodes arranged in a matrix-like pattern is irradiated forward via a projection lens.

When the vehicle illumination lamp comprises a single lamp unit having a single light-emitting diode as a light source, it is difficult to secure a sufficient amount of irradiated light. However, when a vehicle illumination lamp comprises a plurality of such lamp units as disclosed in JP-A-2003-317513, or includes a plurality of light-emitting diodes serving as a light source as disclosed in JP-A-2001-266620, a sufficient amount of irradiated light can be secured.

In the vehicle illumination lamp described in JP-A-2003-317513, however, there is a problem in that an optical axis of the projection lens of each lamp unit needs to be accurately positioned to precisely effect light irradiation control. As a result, the lamp is complicated in structure.

On the other hand, in the vehicle illumination lamp described in JP-A-2001-266620, direct light from each light-emitting diode is incident on the projection lens. Therefore, there is a problem in that the rate of utilization of light flux from the light-emitting diode is considerably low.

SUMMARY OF THE EXEMPLARY, NON-LIMITING EMBODIMENTS OF THE INVENTION

An object of the invention is to provide a vehicle illumination lamp having light-emitting elements as a light source, in which the rate of utilization of light flux is enhanced, and a lamp structure is simplified, and besides a light irradiation control can be effected precisely. However, the present invention may achieve other objects, or no objects at all.

In one exemplary, non-limiting embodiment of the present invention, a construction is provided in which light from each of light-emitting elements is reflected forward by a corresponding reflector, and is irradiated forward via a projection lens, and a cylindrical lens of a predetermined design is used as this projection lens.

More specifically, according to the embodiment, there is provided a vehicle illumination lamp wherein light-emitting elements are used as light sources, characterized in that:

the lamp comprises a cylindrical lens disposed to extend generally in a right-left direction, a plurality of the light-emitting elements which are disposed rearwardly of a rear focal line of the cylindrical lens, and are arranged at predetermined intervals generally in the right-left direction, and a plurality of reflectors for respectively reflecting light from the light-emitting elements forward; and a reflecting surface of each of the reflectors has a generally elliptical vertical cross-sectional shape in a vertical plane perpendicular to the rear focal line such that its first focus is disposed in the vicinity of a center of light-emission of the corresponding light-emitting element, while its second focus lies at a point disposed in the vicinity of the rear focal line.

The above "vehicle illumination lamp" is not particularly limited to any specified kind, and for example a headlamp, a fog lamp, a cornering lamp, daytime running lamp or others can be adopted.

The above term "right-left direction" means a horizontal direction perpendicular to a forward-rearward direction (used as a reference) of the vehicle illumination lamp. The forward-rearward direction of the vehicle illumination lamp may or may not coincide with a forward-rearward direction of the vehicle.

In so far as the above "cylindrical lens" is disposed to extend generally in the right-left direction, it may be an ordinary cylindrical lens having a linearly-extending rear focal line, or a lens (such as a substantially toroidal lens) having a rear focal line extending in a curved manner, or a combination of these lens.

The above term "light-emitting element" means an element-like light source having a light-emitting portion which emits generally spot-like light, and it is not particularly to any specified kind, and for example a light-emitting diode or a laser diode can be used.

In so far as the reflecting surface of each of the reflectors has the generally elliptical vertical cross-sectional shape in the vertical plane substantially perpendicular to the rear focal line such that its first focus is disposed in the vicinity of the center of light-emission of the corresponding light-emitting element, while its second focus lies at the point disposed in the vicinity of the rear focal line, its size, horizontal cross-sectional shape, etc., are not particularly limited.

As described above, the vehicle illumination lamp of the present invention comprises the cylindrical lens disposed to extend generally in the right-left direction, the plurality of the light-emitting elements which are disposed rearwardly of the rear focal line of the cylindrical lens, and are arranged at predetermined intervals generally in the right-left direction, and the plurality of reflectors for respectively reflecting light from the light-emitting elements forward. With this construction, the light from each light-emitting element is reflected by the corresponding reflector, and is irradiated forward via the cylindrical lens, and by doing so, the rate of utilization of light flux from each light-emitting element can be enhanced.

The reflecting surface of each of the reflectors has the generally elliptical vertical cross-sectional shape in the vertical plane perpendicular to the rear focal line such that its first focus is disposed in the vicinity of the center of light-emission of the corresponding light-emitting element, while its second focus lies at the point disposed in the vicinity of the rear focal line. Therefore, an image of each light-emitting element, which is formed in a plane in which the rear focal line of the cylindrical lens lies, can be formed into a relatively small width in the upward-downward direction, and these light source images can be projected in an inverted manner with respect to the upward-downward direction by the cylindrical lens, so that a luminous distribution pattern, having a relatively small width in the upward-downward direction, can be formed.

Additionally, the cylindrical lens having the uniform vertical cross-sectional shape is used as the projection lens. Therefore, when the cylindrical lens is slightly deviated from its proper position in the right-left direction or when each of the reflectors is slightly deviated from its proper position in the right-left direction, the outgoing light from the cylindrical lens hardly varies, so that the luminous distribution pattern of a generally constant shape can be formed. Therefore, the lamp structure can be simplified.

Thus, in the vehicle illumination lamp of the invention using the light-emitting elements as the light sources, the rate of utilization of the light flux can be enhanced, and also the lamp structure is simplified, and besides the light irradiation control can be effected precisely.

When the vehicle illumination lamp of the invention is observed from the exterior, the cylindrical lens, disposed to extend in the right-left direction, can be viewed. Therefore, the design of the lamp can be made neat as compared with a conventional vehicle illumination lamp having a plurality of juxtaposed projection lenses.

In the above construction, the horizontal cross-sectional shape of each reflector is not particularly limited to any specified shape as described above. However, when the reflecting surface has a generally parabolic horizontal cross-sectional shape such that its focus is disposed in the vicinity of the center of light-emission of the corresponding light-emitting element and that its axis is defined by a straight line perpendicularly intersecting the rear focal line of the cylindrical lens, the reflected light from each reflector can be incident on the cylindrical lens as generally parallel rays of light hardly diffusing in the horizontal direction, and then can go out of the cylindrical lens as such generally parallel rays of light. Therefore, there can be formed the bright luminous distribution pattern which hardly diffuses in the horizontal direction.

In the vehicle illumination lamp of the above construction, there can be provided a light control member having an upper end edge extending along the rear focal line of the cylindrical lens, and this light control member prevents part of the light, which is emitted from each light-emitting element, and then is reflected by the corresponding reflector, from going straight, thereby eliminating upwardly-directed outgoing light from the cylindrical lens. With this construction, there can be formed the luminous distribution pattern Pa having a clear cut-off line at its upper end edge, and therefore the visibility ahead of the vehicle illumination lamp can be enhanced without imparting a glare to the drivers of vehicles coming from the opposite direction.

In the above construction, when at least part of the rear focal line of the cylindrical lens extends in a curved manner, light from the vehicle illumination lamp can be irradiated not only forward in the forward-rearward direction of the lamp but also in a direction inclined in the right-left direction relative to the forward-rearward direction of the lamp. Further, the lamp can be formed into such an outer shape as to extend along the contour of the vehicle body or the like.

DETAILED DESCRIPTION OF THE EXEMPLARY, NON-LIMITING EMBODIMENTS

Exemplary, non-limiting embodiments will now be described with reference to the drawings. First, the first exemplary, non-limiting embodiment will be described.

Figure 1:
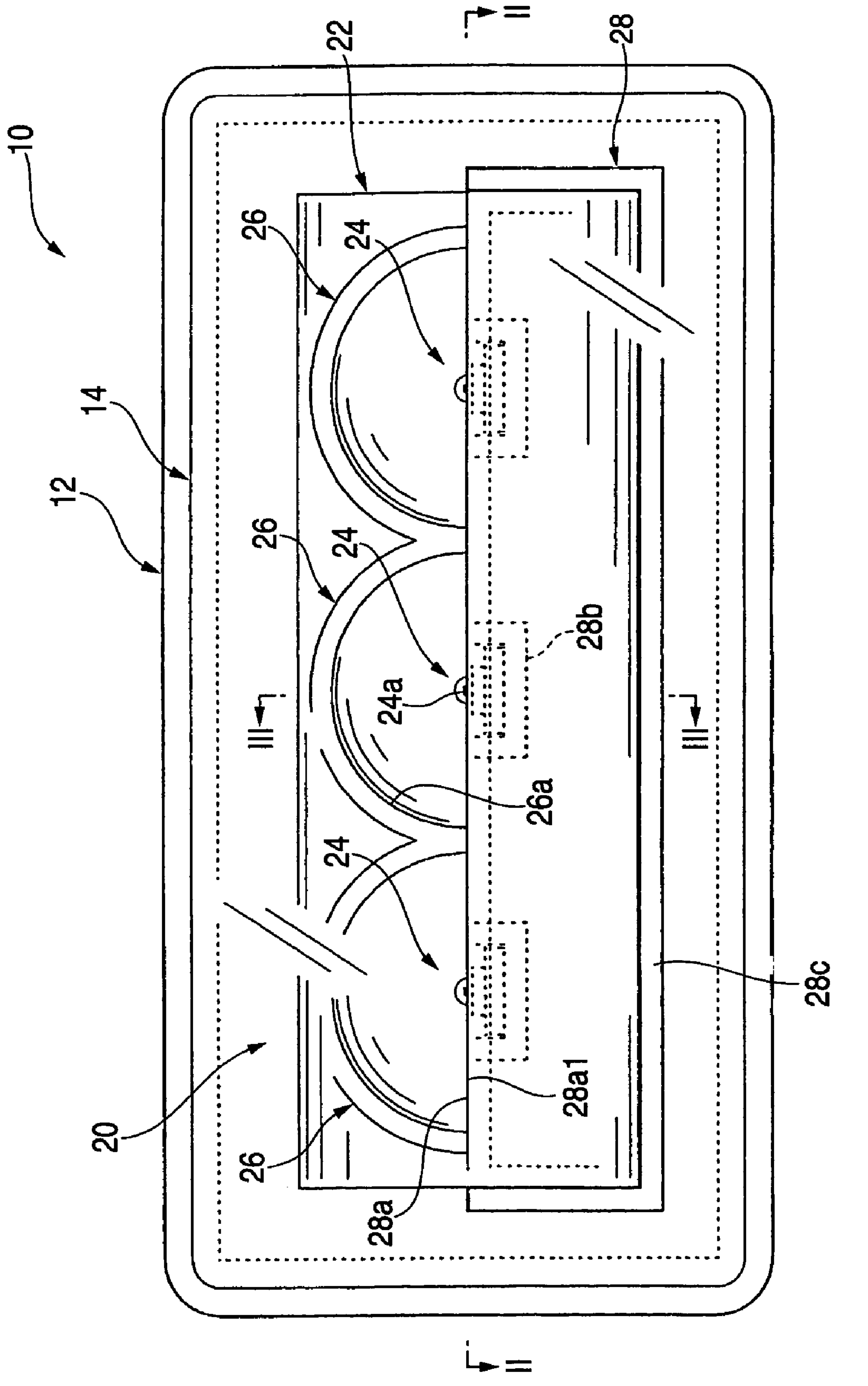
FIG. 1 is a front-elevational view of a first exemplary, non-limiting embodiment of a vehicle illumination lamp.
Figure 2:
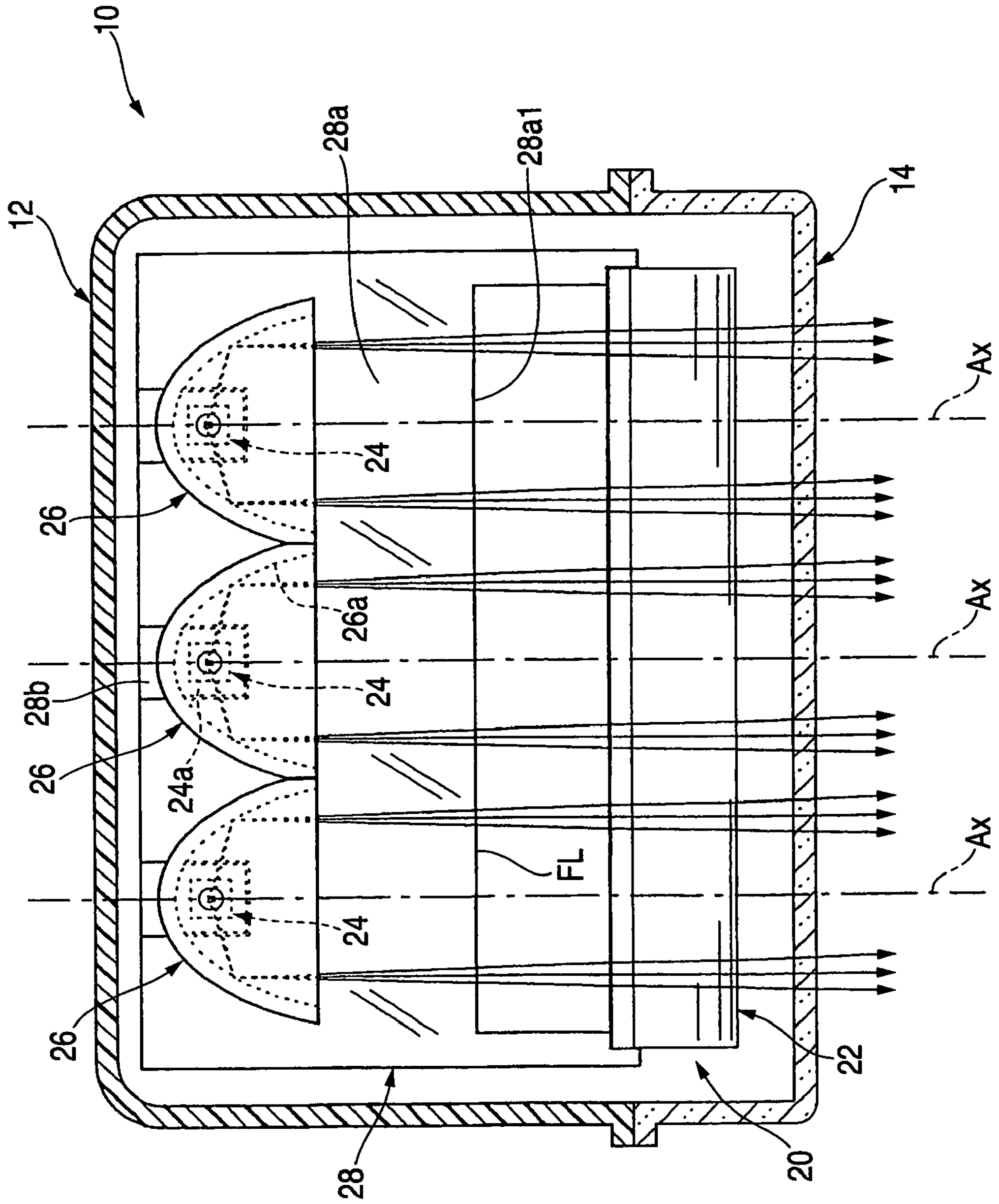
FIG. 2 is a cross-sectional view taken along the line II—II of FIG. 1 of the first embodiment.
Figure 3:
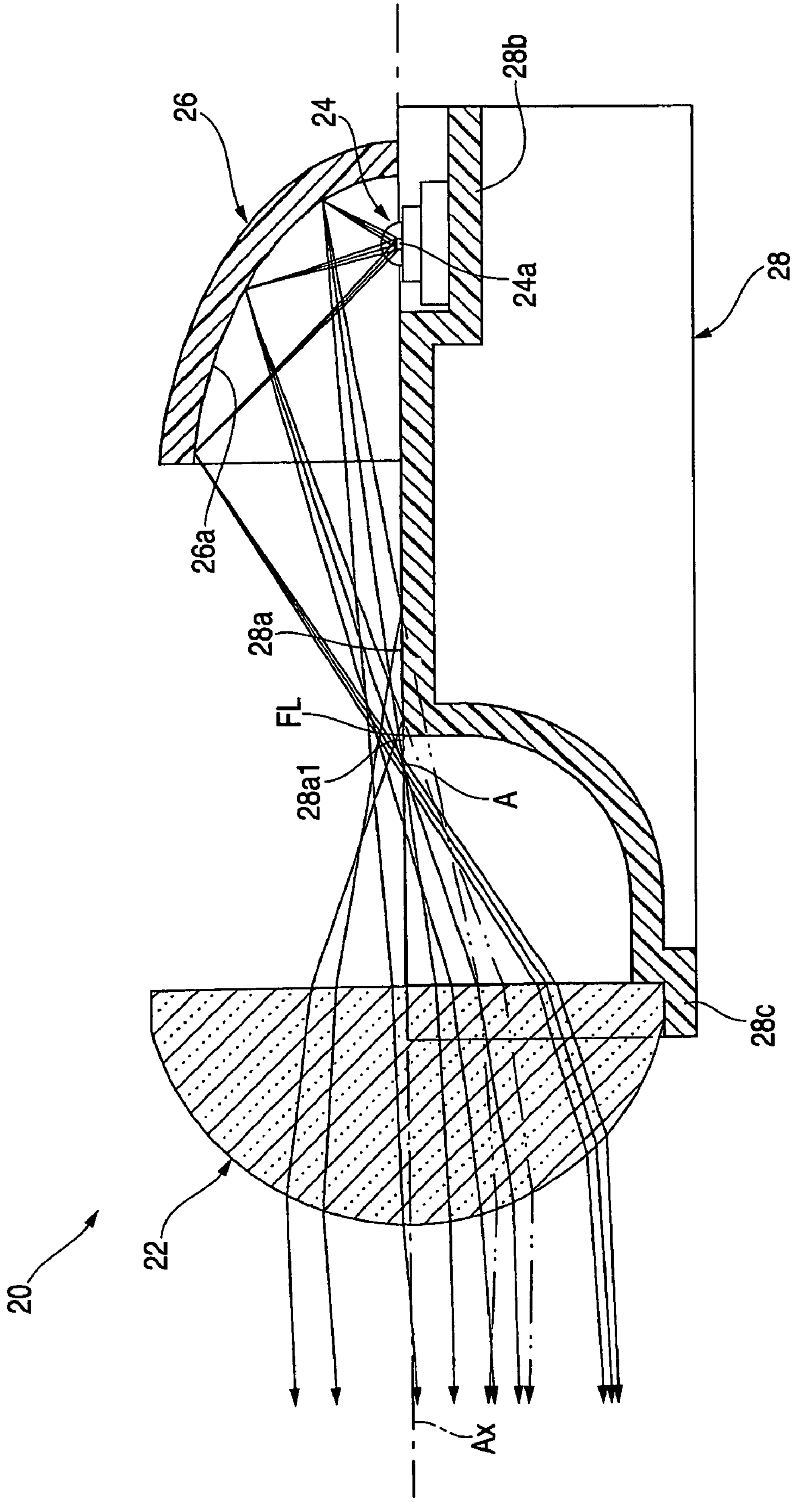
FIG. 3 is a cross-sectional view of the first embodiment taken along the line III—III of FIG. 1.

FIG. 1 is a front-elevational view of a vehicle illumination lamp 10 of this embodiment, and FIGS. 2 and 3 are cross-sectional views taken respectively along the line II—II and the line III—III of FIG. 1.

This vehicle illumination lamp 10 is mounted on a front end portion of a vehicle, and is directed forward in the forward-rearward orientation of the vehicle. This vehicle illumination lamp may be used as part of a headlamp.

The vehicle illumination lamp 10 has a lamp unit 20 received within a lamp chamber which is formed by a lamp body 12 and a clear, light-transmitting cover 14 attached to a front open end of the lamp body 12.

The lamp unit 20 comprises a substantially cylindrical lens 22 disposed to extend in a direction of a width of the vehicle, three light-emitting elements 24, which are disposed rearwardly of a rear focal line FL of the cylindrical lens 22, and are arranged at equal intervals in the direction of the width of the vehicle, three reflectors 26 for respectively reflecting light from the light-emitting elements 24 forward, and a light control member 28 having an upper surface **28*a*** defined by a horizontal surface including the rear focal line FL.

The cylindrical lens 22 has a front surface defined by a convex surface, and a rear surface defined by a planar surface. This cylindrical lens 22 is fixedly supported on a lens holding portion **28*c* formed at a front end of the light control member 28**.

Each of the light-emitting elements 24 is a white light-emitting diode having a light-emitting chip **24*a* of a square shape each side of which is about 0.3 mm to about 3 mm. Each light-emitting element 24 is fixed on an upper surface of a corresponding light source-supporting recess 28*b* formed in a rear end portion of the light control member 28 such that the light-emitting chip 24*a*** lies in a substantially horizontal plane including the rear focal line FL, and faces substantially vertically or upwardly.

The reflectors 26 are arranged respectively on optical axes Ax (which extend in a forward-rearward orientation of the lamp, and pass respectively through centers of light-emission of the light-emitting elements 24), and cover the light-emitting elements 24 from the upper side, respectively. The reflectors 26 are fixed at their lower peripheral edges to the upper surface 28*a* of the light control member 28.

A reflecting surface 26*a* of each of the reflectors 26 has a substantially elliptical vertical cross-sectional shape in a vertical plane including its optical axis Ax such that its first focus is disposed at the center of light-emission of the corresponding light-emitting element 24, while its second focus lies at a point A which is disposed on the optical axis Ax in slightly forwardly-spaced relation to the rear focal line FL. Also, the reflecting surface 26*a* has a parabolic horizontal cross-sectional shape such that its focus is disposed at the center of light-emission of the corresponding light-emitting element 24 and that its axis coincides with the optical axis Ax.

Therefore, with respect to the upward-downward orientation, each reflector 26 reflects light from the corresponding light-emitting element 24 forward toward the optical axis Ax, thus causing the light to generally converge on the point A. With respect to the horizontal direction, the reflector 26 reflects light from the light-emitting element 24 forward in a direction generally parallel to the optical axis Ax.

In this exemplary, non-limiting embodiment, the three reflectors 26 are formed into an integral construction.

A specular treatment is applied to the upper surface 28*a* of the light control member 28 by aluminization or the like. Therefore this upper surface 28*a* serves as a reflecting surface. A front end edge 28*a*1 of the upper surface 28*a*, disposed rearwardly of the cylindrical lens 22, extends linearly along the rear focal line FL of the cylindrical lens 22.

The upper surface 28*a* of the light control member 28 prevents part of the reflected light from the reflecting surface 26*a* of each of the reflectors 26 from going straight, thereby eliminating upwardly-directed outgoing light from the cylindrical lens 22. Here, the upper surface 28*a* of the light control member 28 serves as the reflecting surface, and the reflected light from each reflector 26 which is incident on the upper surface 28*a* is reflected upward by this upper surface 28*a*, and is incident on the cylindrical lens 22, and goes downward out of the cylindrical lens 22 as shown in FIG. 3.

Figure 4:
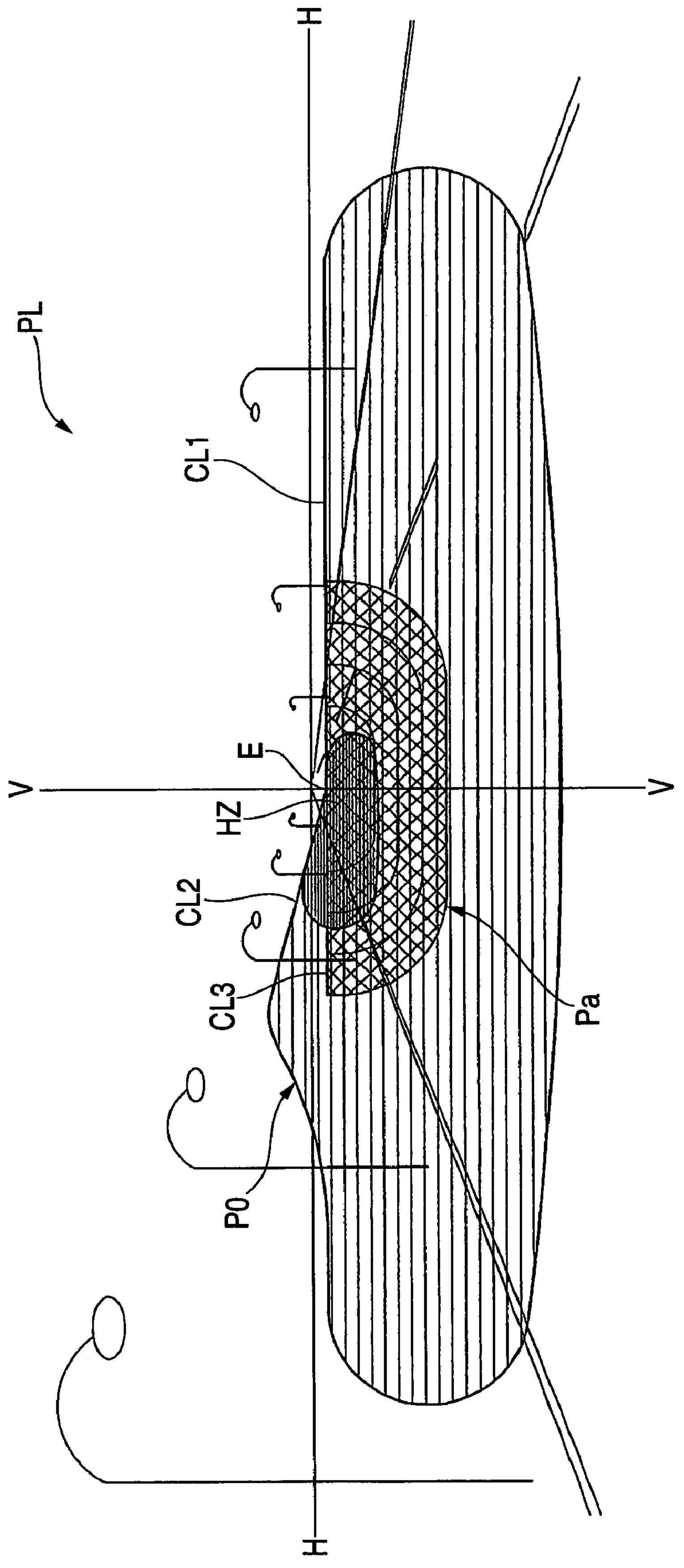
FIG. 4 is an perspective view showing a luminous distribution pattern formed (as part of a low-beam luminous distribution pattern) on an imaginary vertical screen, spaced forwardly from the vehicle, by light irradiated forward from the vehicle illumination lamp.

FIG. 4 is perspective view showing a luminous distribution pattern Pa formed (as part of a low-beam luminous distribution pattern PL) on an imaginary vertical screen, spaced about 25 m forwardly from the vehicle, by light irradiated forward from the vehicle illumination lamp 10.

The low-beam luminous distribution pattern PL is a left low-beam luminous distribution pattern which is a combination luminous distribution pattern composed of the luminous distribution pattern Pa and a basic luminous distribution pattern P0 formed by light irradiated from a headlamp body (not shown).

The basic luminous distribution pattern P0 has a horizontal cut-off line CL1 and an oblique cut-off line CL2 at its upper end, and an elbow point E (which is a point of intersection of the two cut-off lines) is disposed slightly (specifically, about 0.5° to about 0.6°) below a point H–V which is a vanishing point in front of the vehicle. This low-beam luminous distribution pattern PL has a hot zone HZ which generally surrounds the elbow point E substantially at the left side of this elbow point.

On the other hand, the luminous distribution patter Pa is spread slightly in the horizontal direction, and has a horizontally-extending cut-off line CL3 at its upper end edge. This cut-off line CL3 is formed as an inverted projected image of the front end edge 28*a*1 of the upper surface 28*a* of the light control member 28.

The luminous distribution pattern Pa is so formed that the cut-off line CL3 is disposed at a level (height) generally equal to the level of the horizontal cut-off line CL1. To achieve this, the vehicle illumination lamp 10 of this embodiment is mounted on the vehicle such that each of the axes Ax is directed slightly (specifically, about 0.5° to about 0.6°) downward relative to the horizontal direction.

In the luminous distribution pattern Pa, a plurality of curves, disposed generally concentric with the profile of this pattern Pa, are equiluminous curves, and indicate that the luminous distribution pattern Pa becomes brighter gradually from its outer peripheral edge toward its center.

The vehicle illumination lamp 10 of this exemplary, non-limiting embodiment comprises the cylindrical lens 22 disposed to extend in the direction of the width of the vehicle, the three light-emitting elements 24 which are disposed rearwardly of the rear focal line FL of the cylindrical lens 22, and are arranged at the equal intervals in the direction of the width of the vehicle, and the three reflectors 26 for respectively reflecting light from the light-emitting elements 24 forward. Therefore, light from each light-emitting element 24 is reflected by the reflector 26, and is radiated forward via the cylindrical lens 22. By doing so, the rate of utilization of the light flux from each light-emitting element 24 can be enhanced.

Here, each of the reflectors 26 has the optical axis Ax perpendicularly intersecting the rear focal line FL of the cylindrical lens 22, and the reflecting surface 26*a* thereof has the elliptical vertical cross-sectional shape in a vertical plane including its optical axis Ax such that its first focus is disposed at the center of light-emission of the corresponding light-emitting element 24, while its second focus lies at the point A which is disposed on the optical axis Ax in slightly forwardly-spaced relation to the rear focal line FL. Therefore, an image of each light-emitting element 24, which is formed in a plane in which the rear focal line of the cylindrical lens 22 lies, can be formed into a relatively small width in the upward-downward direction. These light source images can be projected in an inverted manner with respect to the upward-downward direction by the cylindrical lens 22, so that the luminous distribution pattern Pa, having a relatively small width in the upward-downward direction, can be formed.

Further, in this embodiment, the cylindrical lens 22, having the uniform vertical cross-sectional shape, is used as the projection lens. Therefore even when the cylindrical lens is slightly deviated from its proper position in the direction of the width of the vehicle or when each of the reflectors 26 is slightly deviated from its proper position in the direction of the width of the vehicle, the outgoing light from the cylindrical lens hardly varies, so that the luminous distribution pattern Pa can be kept generally to its shape. Therefore, the lamp structure can be simplified.

In this embodiment, thus, the rate of utilization of the light flux can be enhanced, and also the lamp structure is simplified, and besides the light irradiation control can be effected precisely.

Particularly in this embodiment, the three reflectors 26 are formed integrally with one another. Therefore, the lamp structure can be further simplified.

When the vehicle illumination lamp 10 of this embodiment is observed from the exterior, the cylindrical lens, disposed to extend in the direction of the width of the vehicle, can be viewed. Therefore, the design of the lamp can be made neat as compared with a conventional vehicle illumination lamp having a plurality of juxtaposed projection lenses.

In the vehicle illumination lamp 10, the reflecting surface 26*a* of each of the reflectors 26 has the parabolic horizontal cross-sectional shape such that its focus is disposed at the center of light-emission of the corresponding light-emitting element 24 and that its axis coincides with the optical axis Ax. Therefore, the reflected light from each reflector 26 can be incident on the cylindrical lens 22 as generally parallel rays of light hardly diffusing in the horizontal direction, and then can go out of the cylindrical lens 22 as such generally parallel rays of light.

As a result, the luminous distribution pattern Pa can be formed into a bright pattern which hardly diffuses in the horizontal direction. Therefore, the brightness in that area of the low-beam luminous distribution pattern PL disposed around the hot zone HZ is reinforced, thereby enhancing the visibility of a distant zone of the road ahead of the vehicle.

The vehicle illumination lamp 10 of this embodiment includes the light control member 28 having the upper surface 28*a* defined by the horizontal surface including the rear focal line FL of the cylindrical lens 22, and the front end edge 28*a*1 of the upper surface 28 extends along the rear focal line FL. The light control member 28 prevents part of the light (which is emitted from the light-emitting element 24, and then is reflected by the reflector 26) from going straight, thereby eliminating upwardly-directed outgoing light from the cylindrical lens 22. Therefore, the luminous distribution pattern Pa can be formed into a luminous distribution pattern having the clear cut-off line CL3 at its upper end edge, and the visibility ahead of the vehicle can be enhanced without imparting a glare to the drivers of vehicles coming from the opposite direction.

Additionally, the upper surface 28*a* of the light control member 28 serves as the reflecting surface. Therefore, the reflected light from each reflector 26 which is incident on the upper surface 28*a* can be used for forming the luminous distribution pattern Pa. Therefore, the rate of utilization of the light flux from each light-emitting element 24 can be further enhanced.

In the above embodiment, the reflecting surface 26*a* of each of the reflectors 26 has the substantially elliptical vertical cross-sectional shape, such that its second focus lies at the point A disposed on the optical axis Ax in slightly forwardly-spaced relation to the rear focal line FL. However, when the point A is shifted forward, the width of the luminous distribution pattern Pa in the upward-downward orientation can be increased.

In contrast, when the point A is shifted toward the rear focal line FL, the width of the luminous distribution pattern Pa in the upward-downward direction can be made smaller, and when the point A is set on the rear focal line FL, the width of the luminous distribution pattern Pa can be made minimum.

In the above embodiment, although the lamp unit 20 is of such a construction that each of the upwardly-directed light-emitting elements 24 is covered with the reflector 26 from the upper side, any other suitable construction can be adopted, as would be known by one of ordinary skill in the art.

In the above embodiment, although the lamp unit 20 includes three sets of light-emitting elements 24 and reflectors 26, any other suitable number of sets can be used, in which case also similar advantageous effects as described above can be obtained.

In the above embodiment, although the three reflectors 26 are formed integrally with one another, the reflectors can be formed separately from one another.

In the above embodiment, although each of the light-emitting elements 24 has the light-emitting chip 24*a* of a square shape each side of which is about 0.3 mm to about 3 mm, the light-emitting chip can have any other suitable shape such for example as a rectangular shape.

In the above embodiment, the light control member 28 has the upper surface 28*a* defined by the horizontal surface including the rear focal line FL of the cylindrical lens 22, and its front end edge 28*a*1 extends along the rear focal line FL. However, instead of this construction, a light control member can be formed by an upstanding shade having an upper end edge extending along the rear focal line FL.

In the above embodiment, although the vehicle illumination lamp 10 is formed as part of the headlamp, it can be formed as an independent lamp (such as a cornering lamp) separate from the headlamp. In this case, although the vehicle illumination lamp 10 is directed forward in the forward-rearward direction of the vehicle in the above embodiment, this vehicle illumination lamp 10 can be outwardly inclined at an angle relative to the forward-rearward direction of the vehicle, in which case the vehicle illumination lamp 10 can be used as a cornering lamp.

Figure 5:
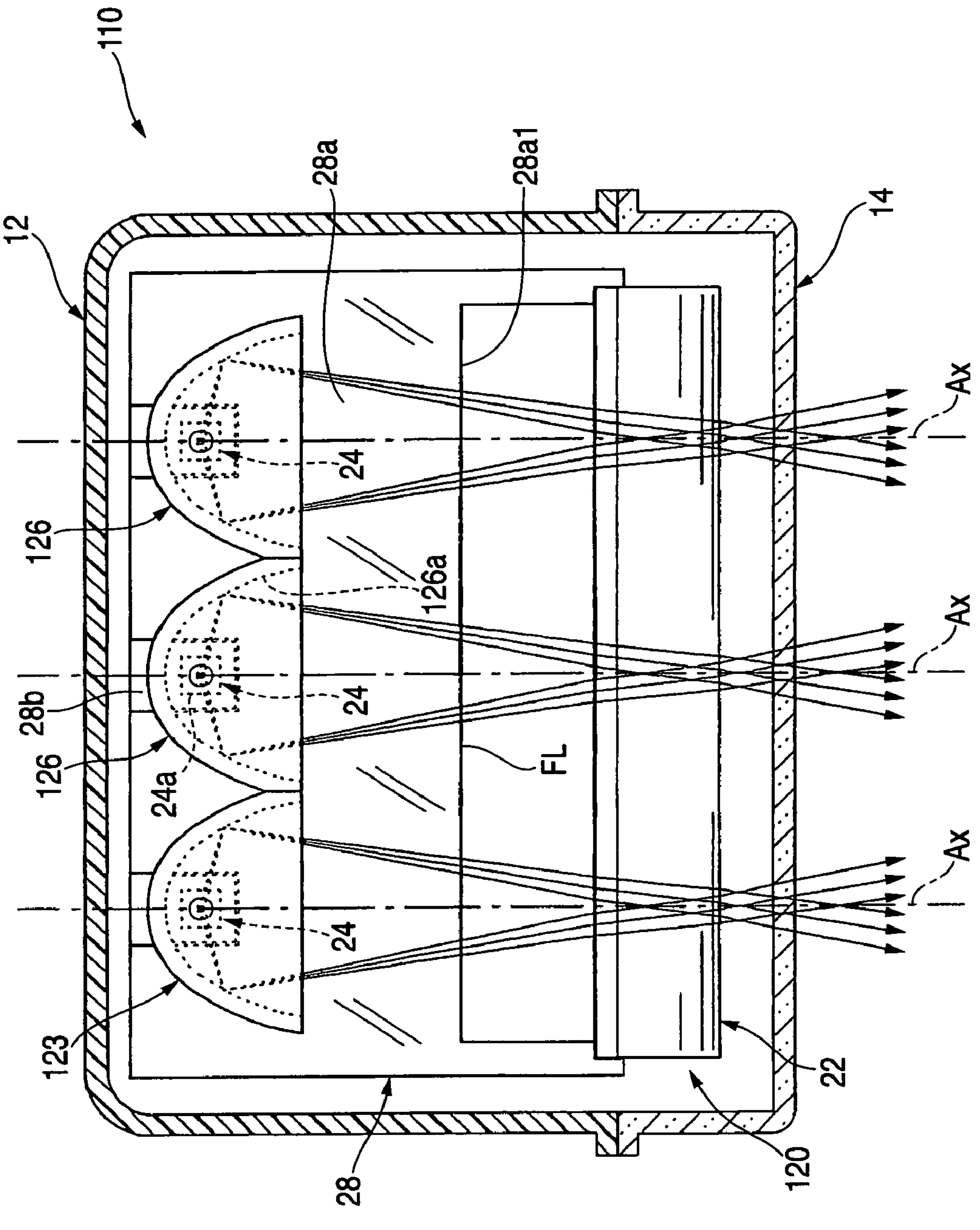
FIG. 5 shows a second exemplary, non-limiting embodiment of a vehicle illumination lamp.

Next, the second exemplary, non-limiting embodiment will be described. FIG. 5 shows a vehicle illumination lamp 110 of this embodiment. This vehicle illumination lamp 110 is substantially identical in construction to the vehicle illumination lamp of the first embodiment, except that reflectors 126 of a lamp unit 120 are different in construction from the reflectors 26 of the first embodiment.

A reflecting surface 126*a* of each of the reflectors 126 of this embodiment has a substantially elliptical horizontal cross-sectional shape, such that its first focus is disposed at the center of light-emission of a corresponding light-emitting element 24, while its second focus lies at a point disposed on an optical axis Ax in considerably forwardly-spaced relation to a rear focal line FL. Therefore, with respect to the horizontal direction, each reflector 126 reflects light from the light-emitting element 24 forward toward the optical axis Ax.

The reflected light from each reflector 126 passes through a cylindrical lens 22, and is once caused to converge, and then is irradiated forward as light diffusing right and left.

The reflecting surface 126*a* of each reflector 126 has substantially the same vertical cross-sectional shape as that of the reflector 26 of the first embodiment.

Figure 6:
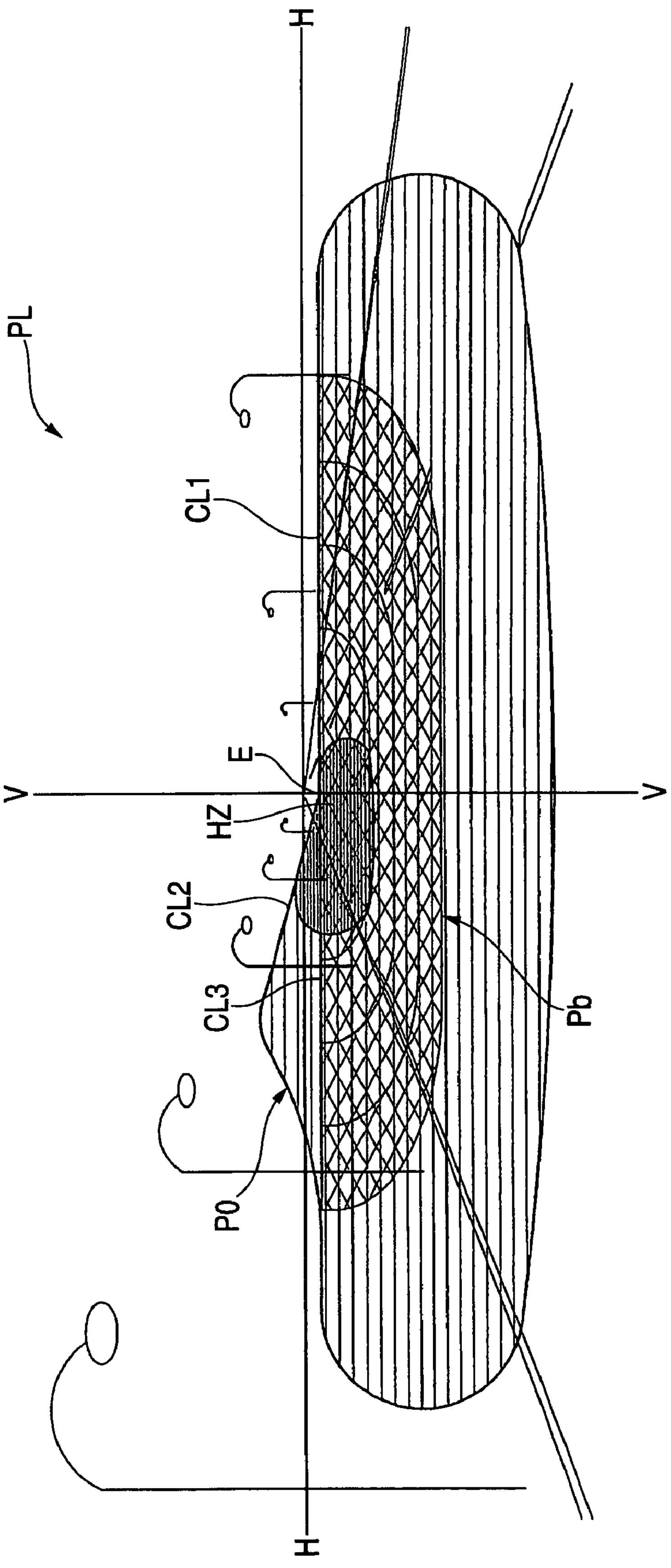
FIG. 6 is a perspective view of a luminous distribution pattern formed (as part of a low-beam luminous distribution pattern) on the above imaginary vertical screen by light irradiated forward from the vehicle illumination lamp of FIG. 5.

FIG. 6 is a perspective view showing a luminous distribution pattern Pb formed (as part of a low-beam luminous distribution pattern PL) on the aforesaid imaginary vertical screen by light irradiated forward from the vehicle illumination lamp 110. The low-beam luminous distribution pattern PL is a combination luminous distribution pattern composed of a basic luminous distribution pattern P0 (which is substantially the same as that of the first embodiment) and the luminous distribution pattern Pb.

Like the luminous distribution pattern Pa of the first embodiment, the luminous distribution patter Pb has a horizontally-extending cut-off line CL3 at its upper end edge. However, since the outgoing light from the cylindrical lens is the right-left diffusing light, this luminous distribution pattern Pb is much more spread in the horizontal direction as compared with the luminous distribution pattern Pa.

By forming this luminous distribution pattern Pb, the brightness in that area of the low-beam luminous distribution pattern PL disposed around a hot zone HZ is reinforced widely in the right-left orientation, so that the visibility of a distant zone of the road ahead of the vehicle, as well as the visibility of right and left shoulders thereof, can be enhanced.

Figure 7:
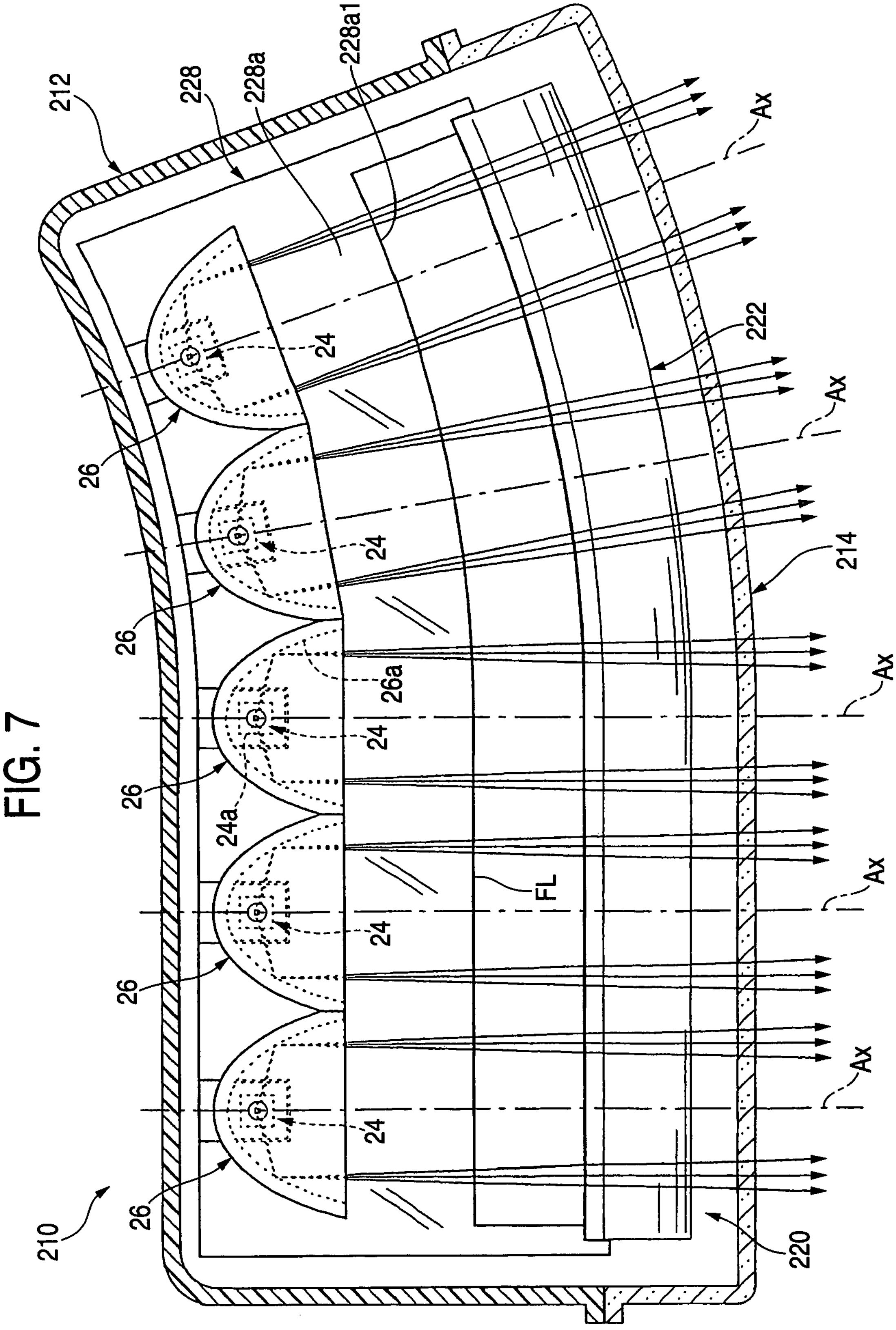
FIG. 7 shows a third exemplary embodiment.

Next, the third exemplary, non-limiting embodiment will be described. FIG. 7 shows a vehicle illumination lamp 210. This vehicle illumination lamp 210 is mounted at a left front end portion of avehicle to extend along the contour of a vehicle body. A light-transmitting cover 214 and a lamp body 212 are so formed that their outer portions with respect to a direction of a width of the vehicle are curved toward a rear side of the vehicle.

Although the lamp unit 220 is substantially identical in basic construction to the lamp unit 20 of the first embodiment, a cylindrical lens 222 is different in shape from the cylindrical lens 22 of the first embodiment. Further, the lamp unit of this embodiment differs from the lamp unit of the first embodiment in that two sets of light-emitting elements 24 and reflectors 26 are added.

The cylindrical lens 222 of this embodiment has such a shape as obtained by extending the cylindrical lens 22 of the first embodiment outwardly in the direction of the width of the vehicle, such that its outer portion is curved toward the rear side of the vehicle. An inner portion of a rear focal line FL of the cylindrical lens 222 with respect to the direction of the width of the vehicle extends straight as with the cylindrical lens 22, while its outer portion with respect to the direction of the width of the vehicle extends in a curved (arcuate) manner toward the rear side of the vehicle.

The two additional sets of light-emitting elements 24 and reflectors 26 are so arranged that their axes Ax are inclined outwardly in the direction of the width of the vehicle respectively at angles (for example but not byway of limitation, about 10° and about 20°) relative to the forward-rearward orientation of the vehicle. The additional light-emitting elements 24 and reflectors 26 are substantially identical in construction to those of the first embodiment.

Accordingly, a light control member 228 also has such a shape as obtained by extending the light control member 28 of the first embodiment outwardly in the direction of the width of the vehicle in such a manner that its outer portion is curved toward the rear side of the vehicle. A front end edge **228*a*1 of an upper surface 228*a* of the light control member 228, disposed rearwardly of the cylindrical lens 222, extends along the rear focal line FL of the cylindrical lens 222. More specifically this front end edge 228*a*1** extends linearly halfway, and its outer portion with respect to the direction of the width of the vehicle extends in a curved (arcuate) manner toward the rear side of the vehicle.

Figure 8:
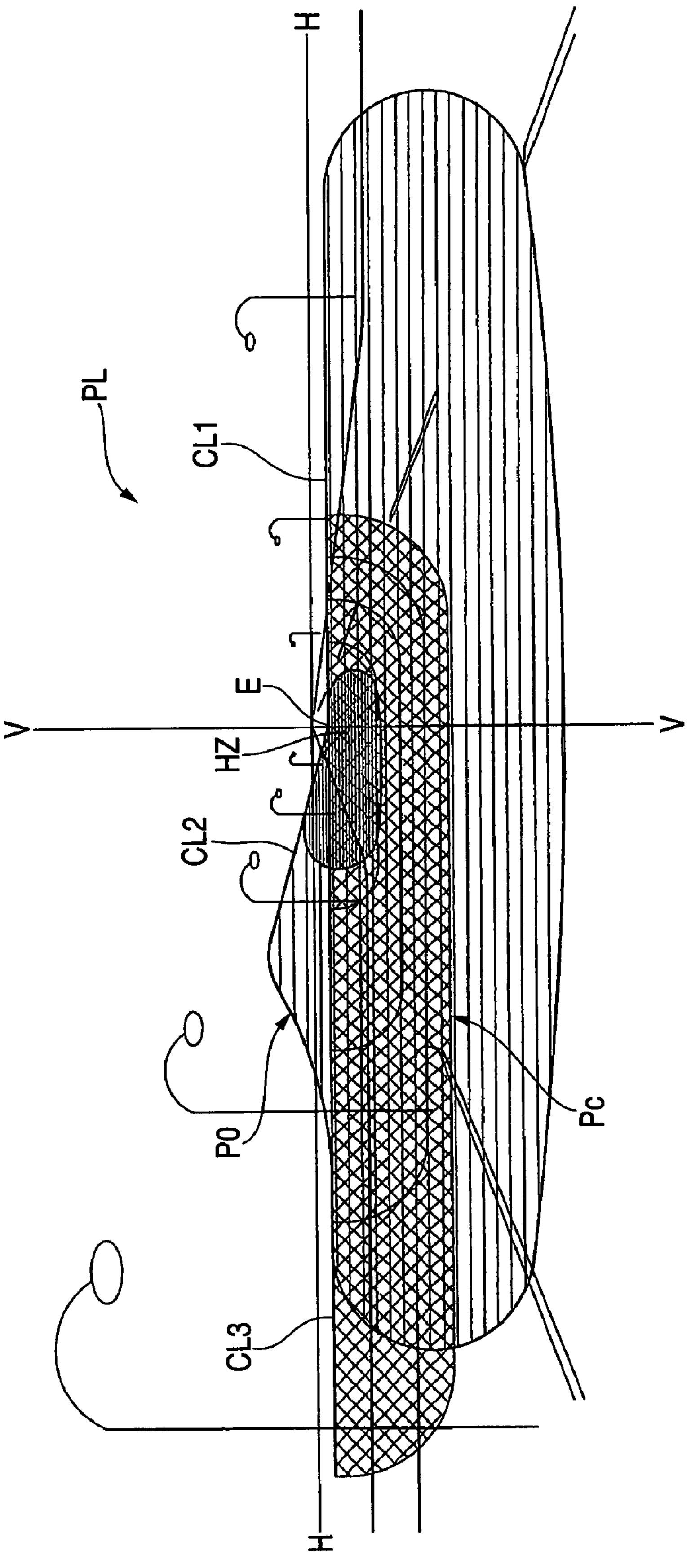
FIG. 8 is a perspective view showing a luminous distribution pattern formed (as part of a low-beam luminous distribution pattern) on the above imaginary vertical screen by light irradiated forward from the vehicle illumination lamp of FIG. 7.

FIG. 8 is a perspective view showing a luminous distribution pattern Pc formed (as part of a low-beam luminous distribution pattern PL) on the aforesaid imaginary vertical screen by light irradiated forward from the vehicle illumination lamp 210. The low-beam luminous distribution pattern PL is a combination luminous distribution pattern composed of a basic luminous distribution pattern P0 (which is substantially the same as that of the first embodiment) and the luminous distribution pattern Pc.

Like the luminous distribution pattern Pa of the first embodiment, the luminous distribution patter Pc has a horizontally-extending cut-off line CL3 at its upper end edge. However, since light from the two additional sets of light-emitting elements 24 and reflectors 26 is added, this luminous distribution pattern Pc is much more spread in the left-hand direction (that is, outwardly in the direction of the width of the vehicle) as compared with the luminous distribution pattern Pa. In this case, the two additional sets of light-emitting elements 24 and reflectors 26 are so arranged that their axes Ax are inclined outwardly in the direction of the width of the vehicle respectively at the angles relative to the forward-rearward direction of the vehicle. Therefore the luminous distribution pattern Pc has such a luminous intensity distribution that the brightness is decreasing gradually toward a left end edge thereof.

With this luminous distribution pattern Pc which is formed by extending the luminous distribution pattern Pa left beyond the left end edge of the basic luminous distribution pattern P0, the brightness in that area of the low-beam luminous distribution pattern PL disposed around a hot zone HZ is reinforced, and the low-beam luminous distribution pattern PL is extended in the left-hand direction. Therefore, the visibility of a distant zone of the road ahead of the vehicle as well as the visibility of a large proportion of a left shoulder thereof can be enhanced. Therefore, the safety of travel can be enhanced not only when the vehicle is traveling straight but also when the vehicle is turning left.

When a vehicle illumination lamp whose structure is substantially bilaterally symmetrical with respect to the structure of the vehicle illumination lamp 210 is mounted on the right front end portion of the vehicle, the visibility of a distant zone of the road ahead of the vehicle as well as the visibility of a large proportion of a right shoulder thereof can also be enhanced. Therefore, the safety of travel can be enhanced not only when the vehicle is traveling straight but also when the vehicle is turning right.

While the invention has been described above with reference to the embodiment, the technical range of the invention is not restricted to the range described in the embodiment. It is apparent to the skilled in the art that various changes or improvements can be made in the embodiment. It is apparent from the appended claims that the embodiment thus changed or improved can also be included in the technical range of the invention.

The invention claimed is:

1. An vehicle illumination lamp having light-emitting elements as light sources, said vehicle illumination lamp comprising:

- a cylindrical lens extending generally in a right-left orientation and having a rear focal line;
- said light-emitting elements disposed rearward of said rear focal line and arranged at intervals generally in the right-left orientation;
- a plurality of reflectors that reflect light forward from said light-emitting elements, wherein each of said reflectors includes a reflecting surface having a substantially elliptical vertical cross-sectional shape in a vertical plane substantially perpendicular to said rear focal line, such that a first focus of said reflecting surface is substantially at a center of light-emission of the corresponding light-emitting element, and a second focus of said reflecting surface is substantially at said rear focal line.

2. The vehicle illumination lamp according to claim 1, wherein said reflecting surface of each of said reflectors has a substantially parabolic horizontal cross-sectional shape, such that a focus of each of said reflectors is substantially at a center of light-emission of the corresponding light-emitting element, and its axis is defined by a straight line perpendicularly intersecting said rear focal line.

3. The vehicle illumination lamp according to claim 1, further comprising:

a light control member having an upper end edge extending along said rear focal line, wherein said light control member prevents a part of light emitted from each light-emitting element and then reflected by the corresponding reflector from traveling in a substantially straight direction, so as to eliminating upwardly-directed outgoing light from said cylindrical lens.

4. The vehicle illumination lamp according claim 1, wherein at least a part of said rear focal line is substantially curved.

* * * * *